(No Model.)
A. J. MARTIN.
SECONDARY BATTERY.
No. 274,802. Patented Mar. 27, 1883.
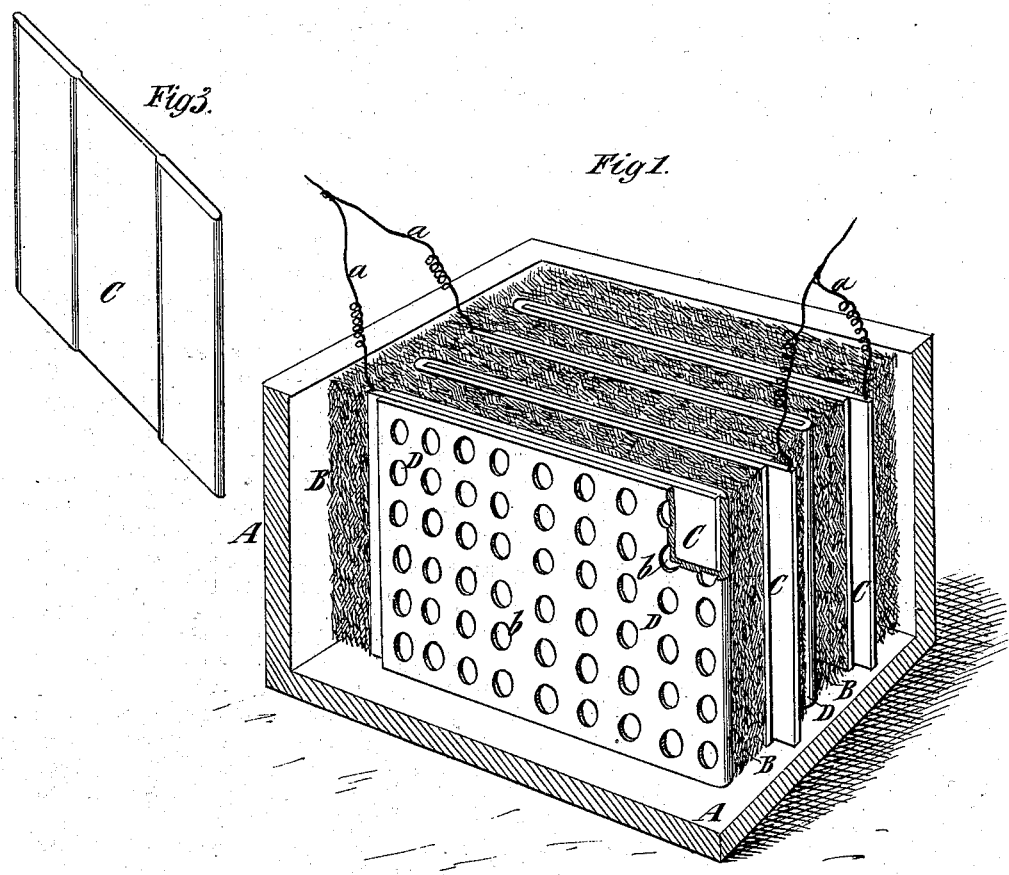
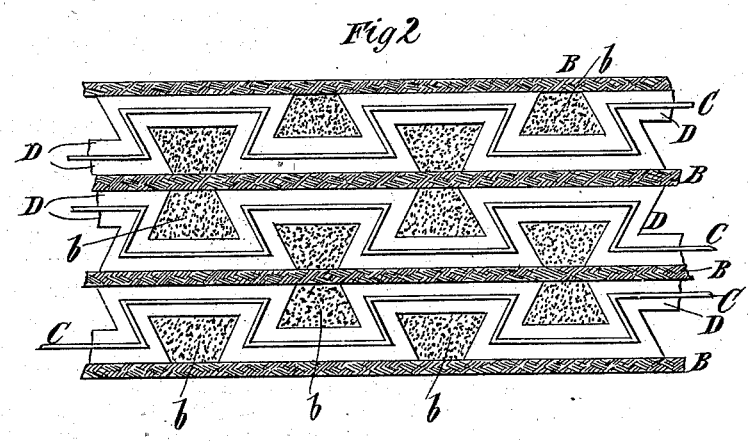

UNITED STATES PATENT OFFICE.

ABRAM J. MARTIN, OF CATSKILL, NEW YORK.

SECONDARY BATTERY.

SPECIFICATION forming part of Letters Patent No. 274,802, dated March 27, 1883.

Application filed June 29, 1882. (No model.)

*To all whom it may concern:*

Be it known that I, ABRAM J. MARTIN, of Catskill, in the county of Greene and State of New York, have invented a new and useful Improvement in Secondary Batteries, of which the following is a specification.

My invention relates to an improvement in storage-batteries, accumulators, or secondary batteries, the operative parts of which have been commonly composed of metallic lead, either alone or in connection with a composition or compound of red lead, oxide, or equivalent salt of lead, the whole being immersed in a bath of acidulated water or other liquid.

It has heretofore been impossible to utilize the whole mass of metallic lead employed, owing to its low degree of conductivity; and an important object of my invention is to transmit the electric current to all parts of the lead plates employed, and render the entire mass uniformly effective in spite of its low power as a conductor.

To this end my invention consists in a compound plate, for use in a secondary battery, composed of two plates of metallic lead and a central conductor or conductors placed and secured between the said plates of lead. The conductor may consist of a plate, wires, or gauze of copper or other conducting material.

The invention also consists in a compound plate for a secondary battery, composed of a central conductor or conductors and a lead covering on both sides thereof, the central conductor or conductors being made thicker at the two ends and thinner at the middle of its or their width for the purpose of conducting or distributing the current with greater facility through the entire plate.

The invention also consists in a compound plate for use in a secondary battery, composed of two plates of metallic lead, provided with recesses or cells, which are dovetailed or undercut, so that they are largest at the bottom or back, and which contain a filling of oxide, red lead, or other suitable material, and a conductor or conductors placed and secured between said plates of lead.

In the accompanying drawings, Figure 1 represents a perspective sectional view of a secondary battery embodying my invention. Fig. 2 represents a horizontal section of a part of a battery of modified form, also embodying my invention; and Fig. 3 designates a conductor of modified form for a compound plate.

Similar letters of reference designate corresponding parts in all the figures.

Referring first to Fig. 1, A designates the box or case of the battery, in which are arranged a number of compound plates separated from each other by means of interposed plates B of any suitable material—such as asbestus— which will be insoluble in the bath of acidulated water employed to fill the box or case.

Each of the compound plates is composed of a central plate, C, of copper or other metal which is a good conductor of electricity, and a lead plate, D, which is represented as folded over both sides of the plate C, and may be secured thereto in any suitable manner. The lead covering-plates may be separately applied to opposite sides of plates C, or the said plates C may have a covering of lead applied by means of electro-deposition.

The plates C are represented as extending slightly beyond the lead covering-plates for convenience in attaching the wire conductors *a*, and the said plates serve to conduct the electric current to all parts of the lead plates D, and thus render the whole mass of lead effective.

In lieu of the plates C being employed, I may interpose between the plates of lead a piece of wire-gauze or conducting-wires, which serve the purpose of plates in conducting electricity to all parts of the lead plates D.

In the lead plates D are formed cells or recesses *b*, which are dovetailed or undercut, so that they are of greatest diameter at the bottom or back, and in these cells or recesses is placed a composition of red lead, oxide, or other suitable salt of lead. A very effective composition is formed of finely-divided metallic lead, such as filings or small granules, and red lead, litharge, or oxide.

I prefer to make the interposed plates B of asbestus or other absorbent material, for then the plates not only help to retain the composition in the recesses or cells *b*, but by their capillary attraction serve to subject the entire plates D to the acidulated water, even when the box A is not filled.

In Fig. 2 are represented compound plates, each composed of a sheet or plate, C, of copper or other conducting metal, and a covering, D, of lead, applied to opposite sides thereof. The plates C and D are of irregular form, and are provided in opposite sides with cells or recesses $b$, which are dovetailed or undercut, so as to retain in them a filling of oxide, red lead, or other composition. Insoluble plates B, preferably of absorbent material—such as asbestus—are interposed between the compound plates, and the whole are placed in a proper box or case with acidulated water. The central conductor may consist of a plate, C, made thicker at the edges or ends and thinner in the middle of its width, as represented in Fig. 3, for the purpose of conducting or distributing the current with greater facility throughout the entire plate.

In both examples of my invention the center plate or conductor distributes the current throughout the lead plates, and subjects every part of the lead plates to its influence. Hence I render a battery or accumulator of a given size more effective, or enable one of smaller size to be equally as effective.

What I claim as my invention, and desire to secure by Letters Patent, is—

1. A compound plate for use in a secondary battery, composed of two plates of metallic lead and a central conductor or conductors placed and secured between the two said plates of lead, substantially as and for the purpose herein described.

2. A compound plate for use in a secondary battery, composed of two plates of metallic lead and a plate of copper placed and secured between said plates of lead, substantially as and for the purpose herein described.

3. A compound plate for a secondary battery, composed of a central conductor or conductors and a lead covering on both sides thereof, the said conductor or conductors being made thicker at the two ends and thinner in the middle of the width for the purpose of conducting or distributing the current with greater facility through the entire plate, substantially as described.

4. A compound plate for use in a secondary battery, composed of two plates of metallic lead, provided with recesses or cells, which are dovetailed or undercut, so that they are largest at the bottom or back, and which contain a filling of oxide, red lead, or other suitable material, and a conductor or conductors placed and secured between said plates of lead, substantially as and for the purpose herein described.

A. J. MARTIN.

Witnesses:
 FREDK. HAYNES,
 ED. L. MORAN.